Feb. 2, 1971 R. W. HALLMAN 3,560,955
BIREFRINGENT DISPLAY SYSTEMS
Original Filed Jan. 23, 1967 2 Sheets-Sheet 1
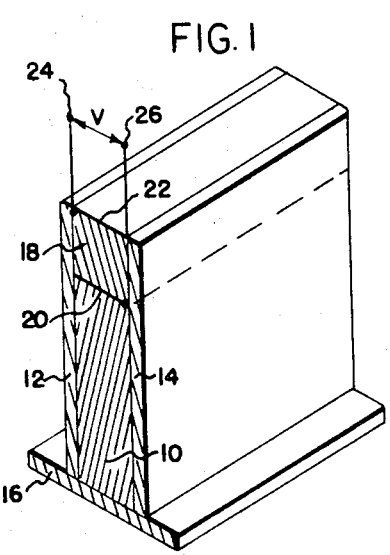
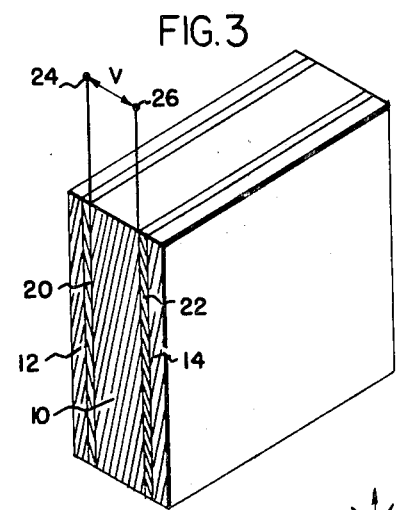
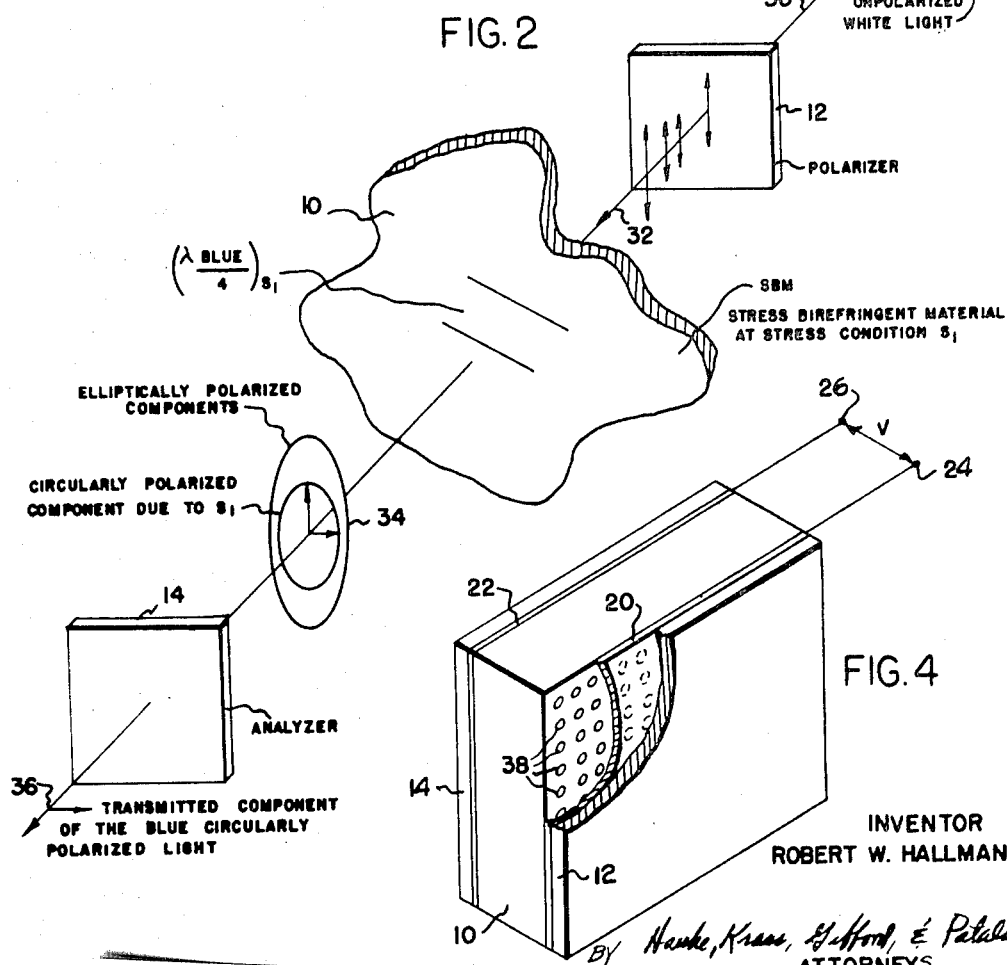
INVENTOR
ROBERT W. HALLMAN

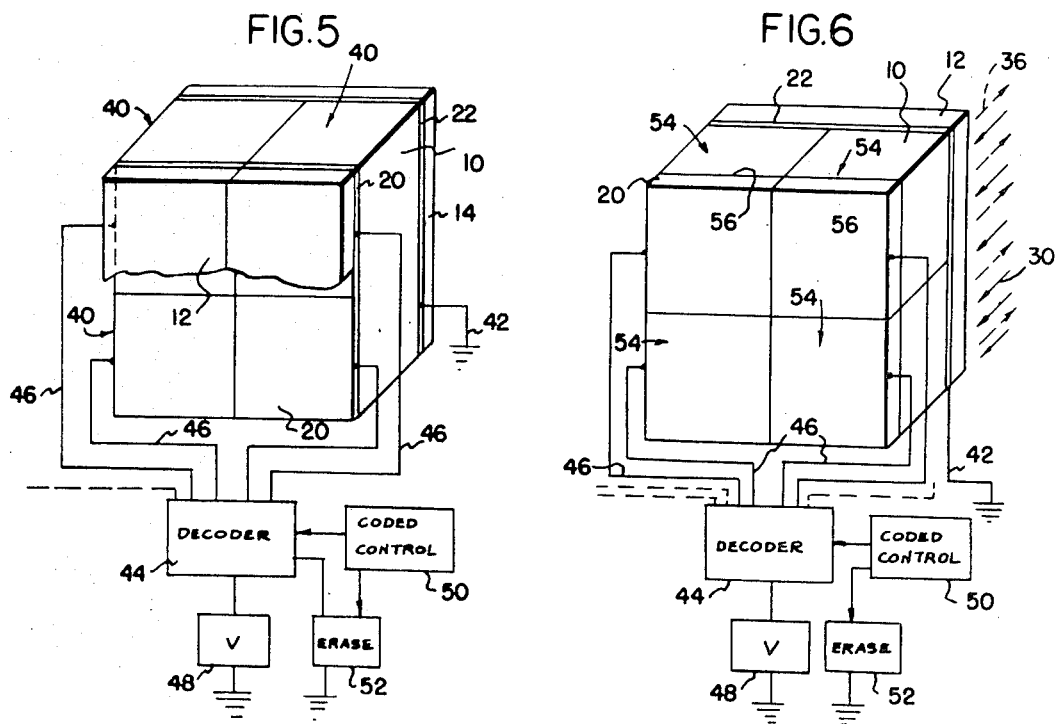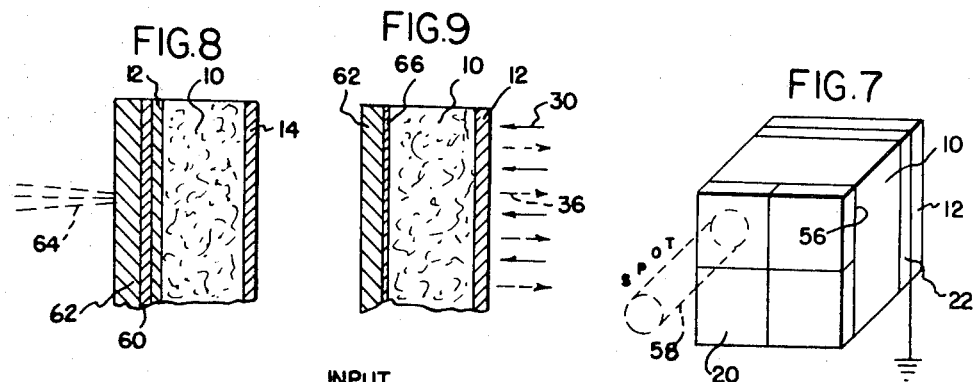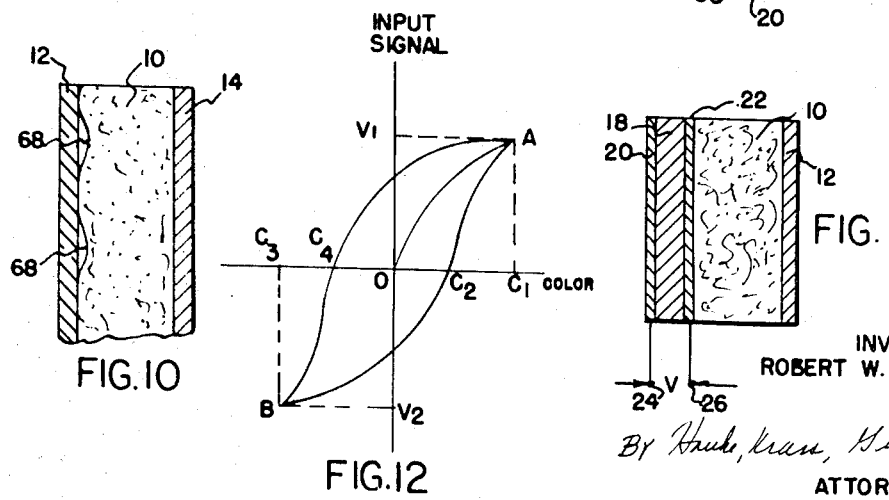

United States Patent Office 3,560,955
Patented Feb. 2, 1971

3,560,955
BIREFRINGENT DISPLAY SYSTEMS
Robert W. Hallman, St. Clair Shores, Mich., assignor to Teeg Research, Inc., Detroit, Mich., a corporation of Delaware
Continuation of application Ser. No. 611,101, Jan. 23, 1967. This application Dec. 30, 1968, Ser. No. 787,952
Int. Cl. G02f 1/24
U.S. Cl. 340—324           33 Claims

ABSTRACT OF THE DISCLOSURE

Optical elements for display systems and the like, utilizing a material capable of exhibiting optical birefringence when placed under stress or strain, provided with different arrangements for locally placing the material under stress by means of electrostriction, magnetostriction, heat distortion, etc., such that the stressed portions of the material acts as variable retardation plate or variable polarizer and display a different color from the color displayed by unstressed portions when polarized light is passed through the material and observed through an analyzer.

CROSS REFERENCE TO RELATED APPLICATION

This application is a continuation of application Ser. No. 611,101, filed Jan. 23, 1967, now abandoned.

BACKGROUND OF THE INVENTION

It has been known for some time that certain isotropic materials exhibit photoelasticity, or mechanical or stress birefrigence when the material is temporarily placed under stress by mechanical means. This phenomenon has been utilized in static and dynamic stress analyses. Materials utilized for such purpose include transparent urethane rubbers, vinyls, cellulose nitrate, catalin, gelatins, glasses, kriston, castolite, etc.

Other materials are capable of exhibiting both birefringence when stressed and electrostrictive qualities. Among those materials are quartz, Rochelle salt, tourmaline, ammonium dihydrogen phosphate, barium titanate and urea.

SUMMARY OF THE INVENTION

The present invention, consequently, relates to novel birefringent display systems utilizing a material which become birefringent when placed under stress. Stress is applied to the material by means of electrostrictive, magnetostrictive, or the like, transducers. The color displayed by the materials, when polarized light is projected therethrough and is observed through an analyzer, is dependent from the amount of stress imposed upon the material. In some applications, the material may be itself electrostrictive or magnetostrictive so that control signals may be applied directly to the material without the use of stress transducers. In other applications, the material is alternately placed under stress and returned to a relaxed condition by means of electrostrictive, magnetostrictive, or the like, transducers that locally deform a portion of the material, or other mechanical means are utilized to locally deform a portion of the material, momentarily or permanently according to the result to be achieved.

The main purpose of the present invention, consequently, is to provide visual display systems capable of offering a multicolor visible display by means of stress induced birefringence, the color of which is dependent on the level of applied stress. The present invention is therefore useful in providing optical memory devices for computers and the like, thin large size optical displays of coded information or of alphanumerical information, multicolor "still" or animated displays such as are commonly represented by cathode ray tubes and the like. Other objects and advantages of the present invention will become apparent when the description of a few examples of application thereof is read in conjunction with the accompanying drawings, wherein like reference numerals refer to like parts.

BRIEF DESCRIPTION OF DRAWINGS

FIG. 1 is a schematic representation of an example of a display element according to the principles of the present invention;

FIG. 2 is an exploded schematic representation of the element of FIG. 1, useful in understanding the principles involved in the invention;

FIG. 3 is a schematic representation of another example of element according to the principles of the invention;

FIG. 4 is a schematic representation of another embodiment of element according to the present invention;

FIG. 5 is a schematic representation of a display board according to the present invention;

FIG. 6 is a modification of the example of FIG. 5;

FIG. 7 is another example of a display board according to the present invention;

FIG. 8 is a schematic representation of a display element according to another aspect of the invention;

FIG. 9 is a modification of the example of FIG. 8;

FIG. 10 is a schematic representation of an element according to a further aspect of the present invention;

FIG. 11 is a schematic representation of a further modification of an element according to the present invention; and FIG. 12 is an hysteresis curve of hue in function of stress.

DESCRIPTION OF THE PREFERRED EMBODIMENTS

Referring now to the drawings, and more particularly to FIG. 1 thereof, a birefringent display element according to the present invention comprises a sheet of transparent isotropic material 10 sandwiched between a polarizer screen 12 disposed on one side thereof and an analyzer screen 14 disposed on the other side. An edge of the sheet of isotropic material 10 is confined by means of a wall 16 and the other edge engages the face of an electrostrictive transducer bar 18. The two faces of the electrostrictive transducer bar 18 are plated, as shown at 20 and 22, with a current conducting thin metallic coating defining electrodes electrically connected respectively to terminals 24 and 26.

The sheet 10 of isotropic material may be a sheet of transparent urethane rubber, vinyl, cellulose nitrate, or gelatine, or the like, which all exhibit photoelasticity or mechanical or stress induced birefringence, and the electrostrictive transducer bar 18 may consist of any one of the wel known electrostrictive materials such as quartz, Rochelle salt, barium titanate, etc. Unpolarized white light is projected through the element of FIG. 1 by being passed successively through the polarizer 12, the sheet of isotropic material 10 and the analyzer 14. When a voltage differential V is applied across the electrostrictive transducer bar 18, the bar expands and applies a stress to the mass of the isotropic material such that it momentarily, while under stress, becomes birefringent. The light projecting therethrough is then observed through the analyzer screen 14 to be of a coloration dependent from the stress applied to the isotropic material sheet 10, which in turn corresponds to the voltage differential applied to the electrostrictive bar 18 through terminals 24–26.

The sequence of optical alterations of the light passing through the element may be explained with reference to FIG. 2. A source of unpolarized white light 28 emits an unpolarized light beam 30 which is linearly polarized in one direction, as shown at 32, by passage through the polarizer sheet 12. The linearly polarized light beam 32 passes then through the stress birefringent material 10 which has been placed at a predetermined stressed state S1. The temporary birefrigence due to stress S1 generates eliptically polarized light, as shown schematically at 34, resulting from a circular component and a linear component. The circular component is proportional to the stress gradient applied to the sheet 10 of isotropic material which is thus caused to act as a quarter wavelength plate for one particular color of the incident linearly polarized light. The stress gradient brings about a molecular alignment in the domain of the isotropic material which causes a phase shift in the linearly polarized light, with the result that the analyzer 14 blocks the linearly polarized light and transmits only one component of the colored circularly polarized light as shown at 36. If the sheet 10 of isotropic material is thus stressed to a certain gradient S1 causing the sheet 10 to act as a quarter wavelength plate for a predetermined color, for example blue, for a different stress S2, a different quarter wavelength plate is created, in the sheet of 10 of isotropic material, which is a quarter wavelength plate for a different color. Consequently, for different stress gradients, as determined by different voltage gradients being applied across terminals 24–26 of FIG. 1, different phase shifts for single wavelength are provoked within the sheet 10 of isotropic material resulting in different colorations of the light as visually observed through analyzer 14.

In addition to the example of embodiment of FIG. 1, the present invention contemplates several configurations employing diverse coupling means between the control electrical signal V and the stress birefringent material. For example, in FIG. 3 is shown an element comprising a polarizer sheet 12 and an analyzer sheet 14 sandwiching a birefringent material 10 which is also electrostrictive. Such material may be a quartz, Rochelle salt, urea, barium titanate, a molecular combination of cross polymer of urea compound and organic group, or the like. Transparent thin films of a current conducting material are plated on two faces of the isotropic material 10, as shown at 20 and 22, and those coatings are connected to terminals 24 and 26 to which are applied a voltage signal V.

When the isotropic material does not exhibit any electrostrictive quality, a display element may be made, as shown in FIG. 4, of a sheet 10 of isotropic material seeded with a plurality of electrostrictive elements 38 substantially uniformly dispersed in the mass of the isotropic material and arranged so as to project completely to the surface of two opposed faces of the isotropic material sheet 10 so as to be in electrical contact with the transparent electrical plate coating or electrodes 20 and 22. The electrostrictive elements 38 may preferably be in the form of elongated needle-like particles of a predetermined width and length which are substantially uniformly dispersed in the mass of the isotropic material while the latter is still in a liquid or plastic state. The particles may be aligned by way of an electric field during curing of the isotropic material being shaped in the form of sheet 10, so as to be uniformly transversely aligned in the mass of the cured sheet.

A polarizing sheet 12 is disposed on one electrode coated face and an analyzer sheet 14 is disposed on the other electrode coated face of the sheet 10 of isotropic material, as previously explained, and conductive electrodes 20 and 22 are electrically connected to terminals 24–26 across which is applied an input signal V. The isotropic material is stressed by means of the electrostrictive elements 38 under the action of the voltage V applied thereacross, and, the electrostrictive elements being uniformly dispersed within the mass of isotropic material, the latter becomes uniformly stressed so as to become momentarily birefringent as long as the voltage signal V is applied across the electrostrictive element 38.

As schematically shown in FIG. 5 the present invention contemplates a display board made of a plurality of indvidual elements 40 arranged in a mosaic-like manner. Each individual element 40 comprises a sheet of birefringent isotropic material 10, which may be any one of the previously described embodiments of FIG. 3 or FIG. 4, each provided with electrode plates 20 and 22, one of such electrodes, 22 for example, being common to all the elements, and all the elements being disposed between a polarizer sheet 12 and an analyzer sheet 14. The common electrode 22 is placed at a certain voltage level, such as the arbitrarily chosen ground level, by means of an electrical conductor 42, and each individual electrode 20 of each element is electrically insulated from its neighbors and is electrically connected to a conventional decoder 44 by way of individual electrical conductors 46. An electrical power supply 48 permits a predetermined voltage gradient to be established between each individual electrode 20 and the common electrode 22 through the decoder 44 according to a coded control originating from control means 50.

Non-polarized light being projected through the display arrangement of FIG. 5 is observed through analyzer sheet 14 and the color exhibited discretely by each individual element 40 corresponds to the stress resulting from the voltage value between common electrode 22 and each individual electrode 20 as controlled by decoder 44, thus the individual colors are dependent from the coded signals received from control means 50. As long as a voltage gradient is maintained, with respect to each individual element 40, a particular color is displayed by each individual element 40 such that the plurality of elements forming the display board is capable of representing a visual display in a permanent manner, the definition of the display being dependent from the area dimensions of each individual element 40. When it is desired to erase the information displayed on the board, control means 50 supplies an erase signal which shunts or short circuits the voltage supply 48 through erase circuit 52 so as to bring the voltage level of each particular electrode 20 to the same level as the voltage of the common electrode 22.

The display board illustrated in FIG. 6 is substantially similar to the display board of FIG. 5, and is controlled in the same manner, but is arranged so as to operate by reflection rather than by transmission of light. In such an arrangement, as schematically illustrated in FIG. 6, the analyzer sheet or filter is omitted, and one of the electrodes of each individual element 54, for example each electrode 20, is light reflective on its face 56 directed toward the isotropic material sheet 10. In this manner, unpolarized light 30 directed such as to pass through polarizing filter 12 is caused to pass through the isotropic material until it is reflected by reflective surface 56 and, if the isotropic material is stressed, the light passing twice through sheet 10, first from the outside to reflecting surface 56 and back to the outer surface of sheet 10 is caused to exhibit a given color when observed through polarized sheet 12 acting as an analyzer filter with respect to the reflected light. Thusly, the reflected light emerging from the polarizer-analyzer 12, as shown arbitrarily by arrows 36, exhibits a color depending from the voltage signals applied between each individual electrode 20 and the common electrode 22.

It is evident that the arrangement shown in the FIGS. 5 and 6 may be inverted such that individual electrodes 20 may be commonly electrically connected to a predetermined voltage level, while the other electrodes 22 are individually placed at different voltage levels to provide predetermined hues or colors.

It is also evident that the coded signal applied to the decoders 44 may be in a binary form and the decoders themselves may be in a form that provides a binary display such that only two predetermined color hues, or three, or more, may be displayed by the board, such as preferably including the three elementary colors or color combinations, blue, red and green whose further combinations permits to reproduce all the different hues comprised in so-called "white" light, the individual elements 40 or 54 of FIG. 5 or FIG. 6, respectively, being small enough so that when observed from a distance the display boards provide a uniform blended visual impression not permitting to visually distinct each individual element one from another. It is also evident that, alternately, the decoders 44 may be controlled in an analog manner such that appropriate voltage values may be discretely applied across each individual element 40 or 54 so that each individual element is capable of exhibiting different progressive colors according to the voltage levels applied thereacross.

As schematically represented in FIG. 7, a display board, for example a display screen for the face of a kinescope, may be obtained by an arrangement consisting of a sheet 10 of isotropic material, either electrostrictive per se or seeded with electrostrictive elements, disposed between a common electrode 22 and a plurality of individual electrodes, electrically insulated from each other, as shown at 20, and a polarizer-analyzer sheet or screen 12 disposed on the one side of the isotropic sheet 10 which is provided with a transparent electrode 22. Each individual electrode 20 has a face, as shown at 56, which is capable of reflecting light. Each individual electrode 20 may be placed at a predetermined potential by means of an electron beam, as schematically represented at 58, which is arranged to scan a mosaic-like surface comprising the plurality of electrodes 20. The electron beam 58 is modulated such as to leave on each individual electrode 20 a voltage charge creating an electric field varying in value according to the modulation of the electron beam which in turn cause "white" light projected through polarizer sheet 12 and isotropic material sheet 10 to be reflected on reflective surfaces 56 to present discretely different colors according to the electrical field created across the isotropic material resulting in different stress values being discretely established in the mass thereof. It is also evident that each individual electrode 20 may consist of a material which becomes electroluminescent under bombardment of a stream of electrons and, that the colors discretely displayed by each individual portion of the isotropic sheet 10 may be directly observed without the use of reflective light, on the condition that a polarizing sheet is disposed between each individual electrode element 20 and the adjoining face of the isotropic material sheet 10.

Referring now to FIG. 8, which schematically represents in cross section a further example of an embodiment according to the principles of the present invention, a sheet 10 of isotropic material, seeded with a uniform dispersion of magnetostrictive elements such as ferrite, is provided with a coating or film of luminescent material disposed behind a polarizer sheet 12, as shown at 60, such that when the electroluminescent coating 60 is excited it produces light. Behind the electroluminescent coating 60 is disposed a coating or film 62 made of a mignetizable material which can be discretely magnetized to a predetermined state according to a magnetic field applied therethrough. Examples of such material are materials quite similar to those used for discrete magnetic recording of sound wave and the like on magnetic tape. Such materials may consist of a nickel-cobalt plating or the like, or of magnetic particles in suspension in a binder, such magnetic particles being ferrites or magnetic iron oxde. When the magnetzable film 62 is discretely locally magnetized by means of a magnetic field, schematically represented at 64, which impinges upon the surface of the magnetizable film, discrete portions of the magnetizable film 62 remains in a predetermined magnetic state which in turn influences the magnetostrictive particles, not shown, uniformly dispersed in the mass of the material forming the isotropic material sheet 10. Under the influence of the discrete magnetic fields caused by the varied state of magnetization of the magnetic film 62, the magnetostrictive elements impose stresses upon the isotropic material 10 which thus becomes birefringent as long as the stress is imposed thereupon. Consequently, visible unpolarized light emitted by electroluminescent coating 60 which is polarized by passing through polarizer 12, when observed through analyzer 14, displays different colors corresponding to different stress levels imposed upon the isotropic material 10. A varied color display is thus observable which corresponds to the information "written" upon the magnetizable film 62. Such an arrangement may be simplified, as shown at FIG. 9, such that the magnetic film 62 is light reflective on its side disposed toward the isotropic material sheet 10, as shown at 66, with the result that unpolarized light 30 being projected through polarizer sheet 12 and caused to pass through the mass of isotropic material is reflected by reflective coatings 66, and is observed emerging, as shown at 36, through polarizer sheet 12 which is now acting as an analyzer. Consequently, if the sheet 10 of isotropic material is caused to become birefringent by diverse stress levels being imposed thereupon by way of magnetostrictive elements uniformly dispersed in the mass thereof, such stress levels being controlled by way of the discrete magnetic fields exhibited by magnetic film 62, a varied color display can thus be observed.

Another means for controlling the display provided by display elements according to the present invention consists in modifying the stress imposed on an isotropic material by mechanical means or by means such as heat. For example, in FIG. 10 is shown a display element comprising a sheet 10 of isotropic material sandwiched between a polarizer 12 and an analyzer 14. The isotropic material sheet 10 is substantially in a plastic state and a heat gradient image, such as for example an infrared image, is projected on one face thereof so as to cause superficial heat-provoked stress causing surface deformations such as shown at 68. The sheet of plastic isotropic material is then solidified so that the stress imposed upon the mass of the isotropic material remains permanently "frozen." If unpolarized light is now projected through the element of FIG. 10, a varied color display is observed through analyzer 10, the hue depending from the stress level applied originally upon the isotropic material 10. When the information thus recorded is sought to be erased, the sheet 10 of isotropic material is brought back to a plastic state, causing erasure of the information and preparing the material for "recording" of new information.

A simple display board may be made, according to the principles of the invention, and as shown schematically in FIG. 11, by providing a plurality of elements each consisting of a substantially thin chip 18 of barium titanate in ceramic form, the chip 18 being coated on both its faces with a thin film of aluminum, as shown at 20 and 22, aluminized face 22 being polished so as to be substantially light reflective. And adhering coating 10 made of a thin coat of a birefringent material lacquer such as urethane rubber, vinyl, cellulose nitrate, etc., is placed upon the aluminized face 22 and is covered by a polarizer screen 12. Aluminized face 20 is electrically connected to a terminal 24 and aluminized face 22 is electrically connected to a terminal 26 so that when a voltage differential is applied across aluminized faces 20 and 22 acting as electrodes, chip 18, which is electrostrictive, places the adhering coating 10 under stress. Light impinging upon the aluminized reflecting surface 22, after passing through polarizer filter 12 and coating 22, can be observed as emerging from polarizer 12 acting for the reflected light as an analyzer, as being endowed with a predetermined color depending from the amount of stress imposed upon the isotropic lacquer coating 10. Consequently, a full display board may be made by an assembly consisting of a multitude of juxtaposed minute individual coated chips disposed in a mosaic fashion. The display board is capable of providing a colored display according to appropriate selection of the individual chips being activated and the voltage applied across each activated chip.

Some electrostrictive materials and most of the magnetostrictive materials exhibit a substantial hysteresis. In other words, when an electric field is applied across an electrostrictive material, the resulting dimensional change in the material is not entirely reversible, and when the electric field or the magnetic field causing the dimensional change is removed, the material does not return to its original dimensions and generally returns only to dimensions which are intermediary between the original dimensions and the dimensions resulting from the application of the electrical or magnetic field. Utilizing such materials as part of the combination in the present invention results in a chromatic curve in function of the value of the input signal as expressed graphically in FIG. 12. If the control element, either an electrostrictive or magnetostrictive element, as included in the combination of the invention, is energized, the color exhibited by the isotropic material controlled by the electrostrictive or magnetostrictive element which is subjected to an input signal varying from zero to V1 generally varies according to curve OA, such as to exhibit a color C1. If the input signal is removed, the hue decays according to curve AC2, such that the isotropic material exhibits a permanent color C2. If an input signal V2, in the opposite direction to signal V1, is now applied to the control element, the isotropic material color varies from C2 to C3 according to curve C2B, and when the input signal V2 is removed, the color decays according to curve BC4 to a permanent value C4. In this manner, the birefringent element is a bistable element endowed with "memory" which is capable of presenting two well defined states providing either color C2 or color C4 according to the direction of the input signal applied thereto.

Birefringent materials, in general, when stressed cause a variable phase shift for "white" unpolarized light and behave as a variable retardation plate when polarized light is projected therethrough, the phase shift or the amount of retardation being a function of the amount of stress applied to the birefringent materials. When a light beam emitted by a laser is projected through a birefringent material, the laster light beam including linearly polarized light, circularly polarized light is caused to emerge from the birefringent material when stressed. Consequently, even without the inclusion of a polarizer and analyzer in the structures herein disclosed, such structures have utility per se as they cause a qualitative and quantitative modification of the physical characteristics of light passing through the birefringent material as a function of the amount of stress applied to the material.

It is obvious that the preceding disclosure and the accompanying illustrations of several practice embodiments of combination of elements according to the principles of the present invention have been given for illustrative purpose only, and that many diverse embodiments and modifications will be readily apparent to those skilled in the art without departing from the scope and spirit of the invention as enunciated hereinafter.

What is claimed as new is:

1. An optical element comprising a sheet of isotropic transparent material capable of exhibiting birefringence when placed under stress, a plurality of stress producing elements substantially uniformly dispersed in said sheet, said stress producing elements belonging to the group consisting of electrostrictive and magnetostrictive materials and means operatively connected to said stress producing elements for controllably applying predetermined amounts of stress to said sheet.

2. The optical element of claim 1 wherein said stress producing elements are electrostrictive elements and said means operatively connected to said electrostrictive elements comprise electrodes in contact with said electrostrictive elements for controllably placing and removing an electric field thereacross.

3. The optical element of claim 2 further comprising a polarizer screen disposed on one side of said sheet.

4. The optical element of claim 3 further comprising an analyzer screen disposed on the other side of said sheet.

5. The optical element of claim 1 further comprising a polarizer screen disposed on one side of said sheet.

6. The optical element of claim 5 further comprising an analyzer screen disposed on the other side of said sheet.

7. The optical element of claim 1 wherein said stress producing elements are magnetostrictive elements and said means operatively connected to said magnetostrictive elements comprises means for controllably causing and removing a magnetic field in proximity of said magnetostrictive elements.

8. An optical element comprising a sheet of isotropic transparent material capable of exhibiting birefringence when placed under stress, a reflective coating disposed on one side of said sheet, a polarizer screen disposed on the other side of said sheet, at least one mechanical stress producing element arranged in engagement with said sheet and means operatively connected to said stress producing element for controllably applying a predetermined amount of stress to said sheet.

9. The optical element of claim 8, wherein said stress producing element is said isotropic material which belongs to a group comprising electrostrictive materials.

10. The optical element of claim 8, wherein said stress producing element comprises heating means causing local and discrete surface deformation of said sheet of isotropic material.

11. The optical element of claim 8 wherein said stress producing element is an electrostrictive element in engagement with said isotropic material.

12. The optical element of claim 11 wherein a plurality of said electrostrictive elements is substantially uniformly dispersed in said isotropic material and said means operatively connected to said electrostrictive elements comprises electrodes in contact with said electrostrictive elements for controllably placing and removing an electric field thereacross.

13. The optical element of claim 8 wherein said stress producing element is a magnetostrictive element in engagement with said isotropic material.

14. The optical element of claim 13 wherein a plurality of magnetostrictive elements is substantially uniformly dispersed in said isotropic material and said means operatively connected to said magnetostrictive elements comprises means for controllably causing and removing a magnetic field in proximity of said magnetostrictive elements.

15. A visual display member comprising a plurality of optical elements according to cliam 8 disposed in a mosaic-like manner side by side, each of said elements being individually controllable by said control means.

16. An optical element comprising a sheet of isotropic transparent material capable of exhibiting birefringence when placed under stress, a plurality of separate mechanical stress producing elements each arranged in engagement with said sheet, control means operatively connected to said stress producing elements for controllably and selectively applying predetermined amounts of stress to discrete portions of said sheet and means for impinging light through said sheet such that the light observed as emerging from said sheet is locally selectively and discretely modified in function of the amount of controllable and selective stress locally applied to said sheet as determined by said control means.

17. The optical element of claim 16 wherein said stress producing elements consist of said sheet of isotropic material which belongs to a group comprising electrostrictive materials cooperating with a plurality of individual electrodes electrically insulated from each other and adapted to receive an electrical charge as placed thereupon by said control means.

18. The optical element of claim 16 wherein each of said stress producing elements is an element of magnetostrictive material disposed in said sheet of isotropic material, and said control means is adapted to locally individually magnetize each said element of magnetostrictive material.

19. The optical element of claim 16 wherein said stress producing elements consist of a plurality of electrostrictive elements substantially uniformly dispersed in said sheet of isotropic material and said control means comprises electrodes in contact with said electrostrictive elements for controllably and selectively placing and removing an electric field thereacross.

20. The optical element of claim 16 wherein said stress producing elements consist of a plurality of magnetostrictive elements substantially uniformly dispersed in said sheet of isotropic material and said control means comprises means for controllably selectively and discretely producing and removing a magnetic field in proximity of said magnetostrictive elements.

21. An optical element comprising a sheet of isotropic transparent material capable of exhibiting birefringence when placed under stress, a polarizer screen disposed on one side of said sheet and an analyzer screen disposed on the other side of said sheet such that said sheet is sandwiched between said screens, a plurality of separate mechanical stress producing elements each arranged in engagement with said sheet, control means operatively connected to said stress producing elements for controllably and selectively applying predetermined amounts of stress to discrete portions of said sheet and means for impinging unpolarized light upon the polarizer screen and through said sheet and analyzer screen such that the light observed as emerging from said analyzer screen is locally selectively and discretely colored in function of the amount of controllable and selective stress locally applied to said sheet as determined by said control means.

22. The optical element of claim 21 wherein said stress producing elements consist of said sheet of isotropic material which belongs to a group comprising electrostrictive materials cooperating with a plurality of individual electrodes electrically insulated from each other and adapted to receive an electrical charge as placed thereupon by said control means.

23. The optical element of claim 21 wherein each of said stress producing elements is an element of magnetostrictive material uniformly dispersed in said sheet of isotropic material, and said control means is adapted to locally individually magnetize each said element of magnetostrictive material.

24. The optical element of claim 21 wherein said stress producing elements consist of a plurality of electrostrictive elements substantially uniformly dispersed in said sheet of isotropic material and said control means comprises electrodes in contact with said electrostrictive elements for controllably and selectively placing and removing an electric field thereacross.

25. The optical element of claim 21 wherein said stress producing elements consist of a plurality of magnetostrictive elements substantially uniformly dispersed in said sheet of isotropic material and said control means comprises means for controllably selectively and discretely producing and removing a magnetic field in proximity of said magnetostrictive elements.

26. An optical element comprising a sheet of isotropic transparent material capable of exhibiting birefringence when placed under stress, a polarizer screen disposed on one side of said sheet and a reflective coating disposed on the other side of said sheet such that said sheet is sandwiched between said screen and said coating, at least one mechanical stress producing element arranged in engagement with said sheet, means operatively connected to said stress producing element for controllably applying a predetermined amount of stress to said sheet and means for impinging unpolarized light upon the polarizer screen and through said sheet upon said reflective coating such that the light observed as emerging from said polarizer screen is colored in function of the amount of stress applied to said sheet as determined by said control means.

27. The optical element of claim 26 wherein said stress producing element is said isotropic material which belong to a group comprising electrostrictive materials.

28. The optical element of claim 26 wherein stress producing element comprises heating means causing local and discrete surface deformation of said sheet of isotropic material.

29. The optical element of claim 26 wherein said stress producing element is an element of electrostrictive material in engagement with said isotropic material.

30. The optical element of claim 29 wherein a plurality of said electrostrictive elements is substantially uniformly dispersed in said isotropic material and said control means comprises electrodes in contact with said electrostrictive elements for controllably placing and removing an electric field thereacross.

31. The optical element of claim 26 wherein said stress producing element is an element of magnetostrictive material in engagement with said isotropic material.

32. The optical element of claim 31 wherein a plurality of magnetostrictive elements is substantially uniformly dispersed in said isotropic material and said control means comprises means for controllably causing and removing a magnetic field in proximity of said magnetostrictive elements.

33. A visual display member comprising a plurality of optical elements according to claim 26 disposed in a mosaic-like manner side by side, each of said elements being individually controllable by said control means.

References Cited

UNITED STATES PATENTS

| | | | |
|---|---|---|---|
| 2,289,205 | 7/1942 | Nagy et al. | 350—161X |
| 2,528,728 | 11/1950 | Rines | 350—150X |
| 2,638,816 | 5/1953 | Stolzer | 350—150 |
| 2,909,973 | 10/1959 | Koelsch et al. | 350—150UX |
| 3,059,538 | 10/1962 | Sherwood et al. | 350—150X |
| 3,131,253 | 4/1964 | Zandman et al. | 350—158X |
| 3,150,356 | 9/1964 | Newman | 350—150X |
| 3,182,574 | 5/1965 | Fleisher et al. | 350—150UX |
| 3,374,473 | 3/1968 | Cummins | 350—150X |
| 2,625,850 | 1/1953 | Stanton | 73—88O |
| 2,730,007 | 1/1956 | Chapman | 73—88O |
| 3,289,526 | 12/1966 | Tuppeny et al. | 73—88O |
| 3,336,834 | 8/1967 | Bineham et al. | 73—88O |

THOMAS B. HABECKER, Primary Examiner

D. L. TRAFTON, Assistant Examiner

U.S. Cl. X.R.

350—149, 150, 151, 161; 356—114, 118, 119; 310—8.1